(12) United States Patent
Kelley et al.

(10) Patent No.: US 9,604,676 B2
(45) Date of Patent: Mar. 28, 2017

(54) METHOD OF PROVIDING A CORROSION BARRIER BETWEEN DISSIMILAR METALS WITH AN EPOXY INSULATOR

(71) Applicant: Ford Global Technologies, LLC, Dearborn, MI (US)

(72) Inventors: Elaine C. Kelley, South Rockwood, MI (US); Robert G. Starbowski, Brighton, MI (US); Robert William Woodall, Westland, MI (US); Michael William Danyo, Trenton, MI (US); Duane Drobnich, Westland, MI (US); Anthony J Grima, South Rockwood, MI (US); Kimberly Ann Lazarz, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 111 days.

(21) Appl. No.: 13/967,670

(22) Filed: Aug. 15, 2013

(65) Prior Publication Data

US 2015/0050075 A1 Feb. 19, 2015

(51) Int. Cl.
*B23B 37/00* (2006.01)
*B62D 27/02* (2006.01)
(Continued)

(52) U.S. Cl.
CPC ........ *B62D 27/026* (2013.01); *B32B 37/0038* (2013.01); *B32B 37/12* (2013.01); *B32B 38/0036* (2013.01); *C23C 26/02* (2013.01); *F16B 5/02* (2013.01); *F16B 11/006* (2013.01); *B32B 2037/1253* (2013.01); *B32B 2038/0076* (2013.01); *B32B 2305/72* (2013.01); *B32B 2307/204* (2013.01); *B32B 2307/206* (2013.01); *B32B 2311/24* (2013.01); *B32B 2311/30* (2013.01); *B32B 2363/00* (2013.01); *B32B 2605/00* (2013.01); *Y10T 403/47* (2015.01)

(58) Field of Classification Search
CPC ........ B32B 38/0036; B32B 2038/0076; B32B 2037/1253; B32B 2307/204; B32B 37/12; C09J 167/02; C09J 167/03; C09J 169/00; C09J 163/00; Y10T 428/31518; Y10T 428/2953

See application file for complete search history.

(56) References Cited

U.S. PATENT DOCUMENTS 5,414,053 A * 5/1995 Volkmann et al. ........... 525/438
7,004,536 B2 2/2006 Wieber
(Continued)

FOREIGN PATENT DOCUMENTS

JP 2012144213 8/2012

*Primary Examiner* — Jacob Cigna
*Assistant Examiner* — Lee A Holly
(74) *Attorney, Agent, or Firm* — Jason Rogers; Price Heneveld LLP

(57) ABSTRACT

A method for providing a corrosion-resistant barrier between bolted dissimilar metals comprising the steps of disposing epoxy adhesive tape on at least one of a first and second metal member, curing the epoxy adhesive tape, applying a corrosion-resistant layer to the first and second metal members, and bolting the first and second metal members together such that the cured epoxy adhesive tape is positioned between the first and second metal members.

7 Claims, 6 Drawing Sheets

(51) Int. Cl.
*F16B 5/02* (2006.01)
*F16B 11/00* (2006.01)
*B32B 37/00* (2006.01)
*B32B 37/12* (2006.01)
*B32B 38/00* (2006.01)
*C23C 26/02* (2006.01)

(56) References Cited

U.S. PATENT DOCUMENTS

| | | |
|---|---|---|
| 7,182,381 B2 | 2/2007 | Ogawa et al. |
| 7,467,452 B2 | 12/2008 | Lande et al. |
| 7,521,093 B2 | 4/2009 | Finerman et al. |
| 7,984,919 B2 | 7/2011 | Nitsche et al. |
| 8,101,036 B2 | 1/2012 | Schroeder et al. |
| 2008/0026247 A1* | 1/2008 | Nakagawa et al. ........... 428/649 |
| 2012/0276362 A1* | 11/2012 | Denavit et al. ............... 428/223 |
| 2013/0218534 A1* | 8/2013 | Hill .................................. 703/2 |
| 2014/0272364 A1* | 9/2014 | Fitz et al. ..................... 428/220 |

* cited by examiner

US 9,604,676 B2

METHOD OF PROVIDING A CORROSION BARRIER BETWEEN DISSIMILAR METALS WITH AN EPOXY INSULATOR

FIELD OF THE INVENTION

The present invention generally relates to corrosion barriers, more specifically, a method for applying an epoxy insulator as a corrosion barrier between dissimilar metals that are bolted together.

BACKGROUND OF THE INVENTION

Providing corrosion-resistant barriers to materials that are used in the manufacture of vehicles is necessary in providing longer lasting vehicles and vehicles that can endure a wide variety of conditions. These corrosion barriers are typically installed at connection points between materials where water, salt and other corrosive materials can infiltrate and remain for extended periods of time. A corrosion barrier that is installed on a particular part can become scratched, worn away, or otherwise degraded during the manufacturing process, such that the corrosion barrier is compromised upon completion of manufacture of the vehicle or during typical use.

SUMMARY OF THE INVENTION

According to one aspect of the present invention, a method for providing a corrosion-resistant barrier between bolted dissimilar metals includes the steps of disposing a film epoxy adhesive on a first metal member and curing the film epoxy adhesive. A corrosion-resistant layer is then applied to the first metal member and a second metal member. The first metal and second metal members are then bolted together such that the cured film epoxy adhesive is positioned between the first metal and second metal barriers.

According to another aspect of the present invention, a method for providing a corrosion-resistant barrier between bolted dissimilar metals comprises the steps of applying a corrosion-resistant layer to first and second metal members and then disposing film epoxy adhesive on the first metal member over the corrosion-resistant layer and curing the film epoxy adhesive. The first metal and second metal members are then bolted together such that the cured film epoxy adhesive is positioned between the first metal and second metal members.

According to yet another aspect of the present invention, a metal-to-metal connection for a vehicle includes first and second metal members, each having an outer surface and a connecting portion, wherein the first and second metal members are coupled at the respective connecting portions. A cured film structural adhesive is disposed between the first and second metal members at the respective connecting portions, wherein the cured structural adhesive is adhered to only the first metal member, and wherein the cured structural adhesive has a consistent thickness. A cured epoxy coating is disposed on the outer surface of the second member and on at least a portion of the outer surface of the first member, wherein the outer surface of the first member is covered by at least one of the cured structural adhesive and the epoxy coating.

These and other aspects, objects, and features of the present invention will be understood and appreciated by those skilled in the art upon studying the following specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
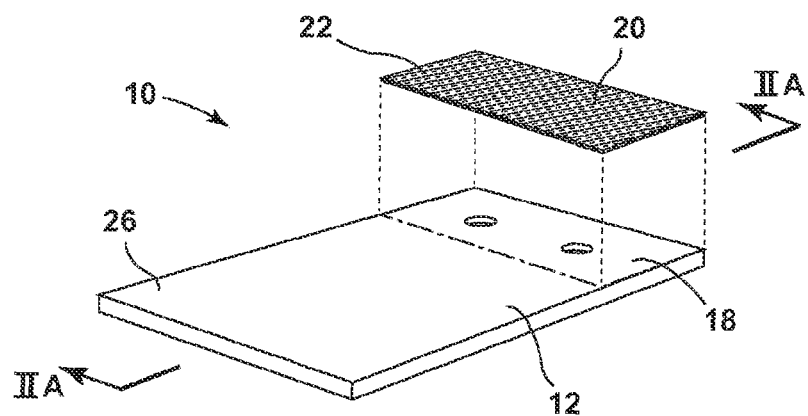
FIG. 1A is an exploded perspective view of the film epoxy adhesive applied to the first metal member according to one embodiment of the method.
Figure 1B:
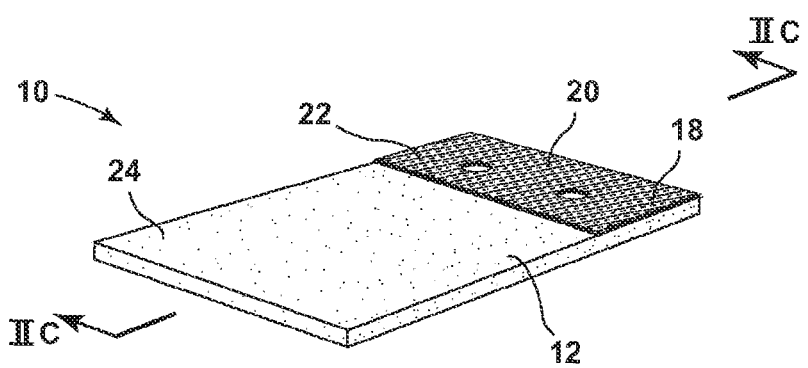
FIG. 1B is a perspective view of the film epoxy adhesive applied to the first metal member and the corrosion-resistant layer also applied according to the method.
Figure 1C:
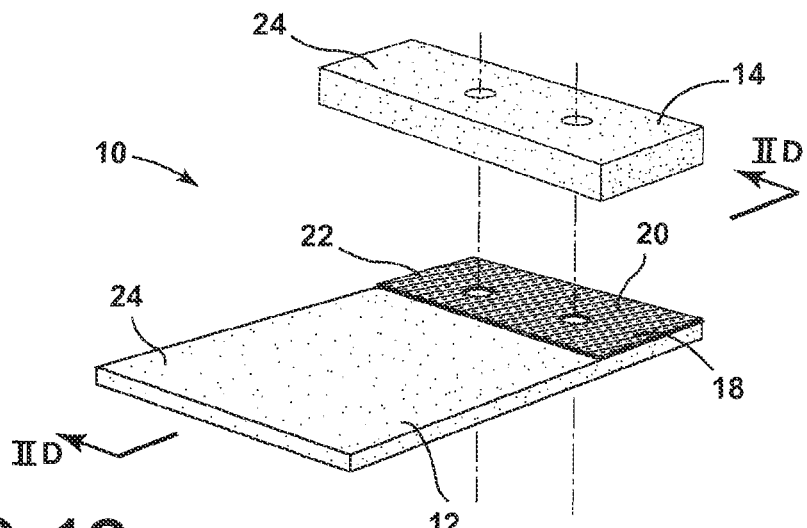
FIG. 1C is a partially exploded perspective view of the embodiment of the method of FIG. 1B, with the second metal member having a corrosion-resistant layer being disposed upon the film epoxy adhesive of the first metal member.

As shown in FIGS. 1A-1C, reference numeral 10 generally refers to a connection 10 between a first metal member 12 and a second metal member 14 where the first metal member 12 and the second metal member 14 are different metallic materials that are to be connected together with a bolt-type connection mechanism 16 at a connection region 18. The connection 10 can be any metal-to-metal connection that is bolted or otherwise mechanically fastened together. By way of example, and not limitation, the connection 10 can be at a point of attachment between the box for a pick-up truck to the frame of the pick-up truck, as well as any other body-panel-to-frame connection. Before the first metal member 12 and the second metal member 14 are connected together at the connection region 18, the connecting region 18 of the first metal member 12 is pretreated with a conversion coating, wherein the conversion coating can be made of materials that include, but are not limited to, Zn, Ti, a combination thereof, or other similar conversion coating or pretreatment material. The conversion coating serves to prevent hydration of aluminum oxide present on the first metal member 12 and ensures a proper surface for which a film epoxy adhesive 20 can adhere to. In addition, the pretreatment serves to make the epoxy film adhesive 20 more durable. After the connecting region 18 is pretreated, the film epoxy adhesive 20 is disposed on the first metal member 12 at the connection region 18, where the first metal member 12 and the second metal member 14 are to be connected. After the film epoxy adhesive 20 is applied to the first metal member 12, the film epoxy adhesive 20 is cured by methods that can include, but are not limited to, heat curing, oven curing, or other similar curing process. Once cured, the film epoxy adhesive 20 is solidified and adhered to the first metal member 12 and the cured film epoxy adhesive 20 has no or substantially little adhesive properties on its exposed surface 22. The film epoxy adhesive 20 is also an insulative and dielectric material that does not conduct electricity.

Figure 2A:
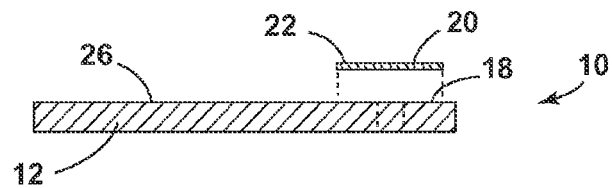
FIG. 2A is a cross-sectional view taken through line IIA-IIA of FIG. 1A.
Figure 2B:
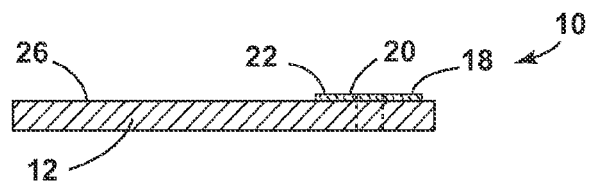
FIG. 2B is a cross-sectional view taken through line IIA-IIA of FIG. 1A with the film epoxy adhesive applied to the first metal member.
Figure 2C:
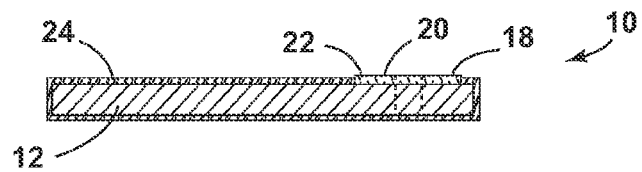
FIG. 2C is a cross-sectional view taken through line IIC-IIC of FIG. 1B.
Figure 2D:
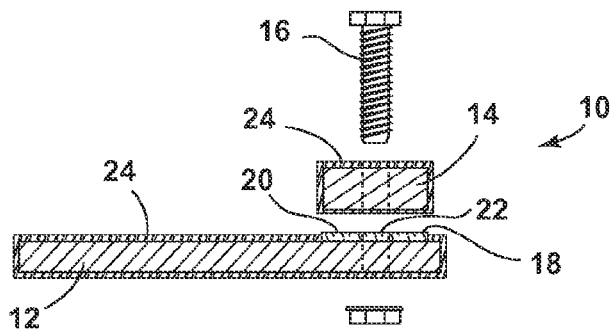
FIG. 2D is a partially exploded cross-sectional view taken through line IID-IID of FIG. 1C, with a nut and bolt connecting member included.
Figure 3:
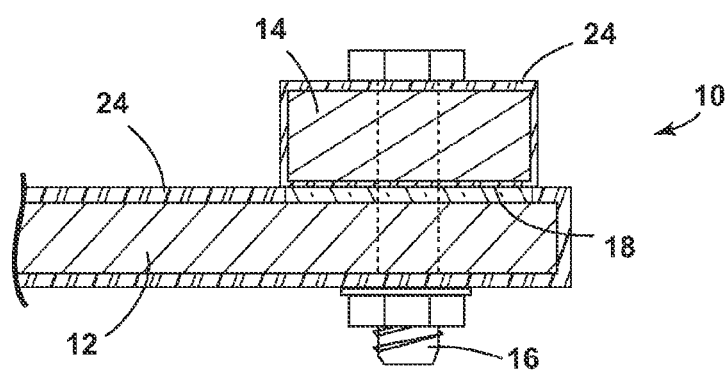
FIG. 3 is a detail cross-sectional view of FIG. 2D with the nut and bolt connector engaged.

As illustrated in FIGS. 2C-3, after being cured, the first metal member 12 and the second metal member 14 are coated with a corrosion-resistant layer 24. The corrosion-resistant layer 24 can be one of several materials that include, but are not limited to, a powder-coat or an electro-coat layer, or a combination thereof. The processes for applying powder-coat and electro-coat layers are known in the art. The corrosion-resistant layer 24 is an epoxy-based layer that, when cured, provides a protective barrier around the metal member. Because of the insulative properties of the cured film epoxy adhesive 20, the exposed surface 22 of the film epoxy adhesive 20 does not receive an electrical charge, such that the electro-coating material does not adhere to the film epoxy adhesive 20. However, the insulative properties of the film epoxy adhesive 20 substantially ensures that the corrosion-resistant material is disposed up to the cured film epoxy adhesive 20. In this manner, the entire outer surface 26 of the first metal member 12 is coated by either the cured film epoxy adhesive 20, or the coated corrosion-resistant layer 24, such that none of the outer surface 26 of the first metal member 12 is exposed.

Additionally, as illustrated in FIGS. 2D and 3, because the coated corrosion-resistant layer 24 does not adhere to the cured film epoxy adhesive 20, the second metal member 14, which is also coated with the corrosion-resistant layer 24, can be positioned on the first metal member 12 in the connection region 18, such that the corrosion-resistant layer 24 of the second metal member 14 engages only the exposed surface 22 of the cured film epoxy adhesive 20 on the first metal member 12 and not the corrosion-resistant layer 24 on the first metal member 12. The first metal member 12 and the second metal member 14 are then bolted together with a nut and bolt connector such that the cured film epoxy adhesive 20 is disposed between the first metal member 12 and the second metal member 14.

The epoxy adhesive 20 described above is applied as a film-type epoxy adhesive, in order to maintain a consistent thickness when the epoxy adhesive 20 is applied and cured. In this manner, the exposed surface 22 of the cured film epoxy adhesive 20 can be substantially smooth without irregularities. More viscous epoxy adhesives that are painted, sprayed, poured or similarly applied to a metallic surface can have ripples, waves, ridges, or other irregularities in the cured and hardened epoxy adhesive that may scratch or otherwise damage the opposing surface, or, alternatively, create locations where water, salt, or other corrosive materials can collect and remain, thereby creating a potential for corrosion to the materials at the connection region 18.

In various embodiments, the film epoxy adhesive 20 has a substantially consistent thickness. The film layer of epoxy adhesive 20 can have a thickness in the range of approximately 0.15 mm to 0.4 mm according to one embodiment. In this manner, after the film epoxy adhesive 20 is cured, the hardened film epoxy adhesive 20 will act as a corrosion-resistant layer 24 that is locally thicker at the connection region 18 between the first metal member 12 and the second metal member 14 than the electro-coated corrosion-resistant layer 24 disposed on the remainder of the first metal member 12. A typical electro-coated corrosion-resistant layer 24 may have a thickness of approximately 0.02 mm. As such, the cured film epoxy adhesive 20 is approximately 10 times thicker than the typical thickness of a cured electro-coated corrosion-resistant layer 24.

In various embodiments, the film epoxy adhesive 20 is heat cured. After being applied to the first metal member 12, the film epoxy adhesive 20 is cured for approximately 20 minutes at approximately 165° C. It should be understood that depending upon the composition of the film epoxy adhesive 20, different lengths of curing time and different temperatures of curing time can be used. The film epoxy adhesive is a structural epoxy adhesive such as that manufactured by 3M®. The structural epoxy adhesive can typically be used to bond materials together, however, according to the embodiment described herein, the adhesive properties of the structural epoxy adhesive are not necessarily used to adhere one member to another. The curing time and temperature used must be sufficient to fully cure the film epoxy adhesive 20 such that the film epoxy adhesive 20 is substantially hardened and no longer uncured adhesive. In other various embodiments, the curing process for the film epoxy adhesive 20 can be combined with the curing process of other materials disposed on the first metal member 12 or other vehicle part requiring a curing process. These curing processes can be combined so long as the length of time and temperature are sufficient to cure all of the materials meant to be cured through the particular curing process.

As illustrated in FIGS. 1A-3, the first metal member 12 is made of aluminum, and the second metal member 14 is made of steel according to one embodiment. It should be appreciated that the method described herein can also be used where the connection 10 includes a first metal member 12 and a second metal member 14 having the same material or other dissimilar materials. Such other dissimilar metals can include, but are not limited to, aluminum alloys, steel alloys, sheet metal, or other metallic material onto which a corrosive-resistant layer 24 is applied.

As discussed above, the film epoxy adhesive 20 is an electric insulator (dielectric) and will not receive a charge as required to deposit the corrosion-resistant layer to the outer surface 26 of the first metal and second metal members 12, 14.

Figure 4:
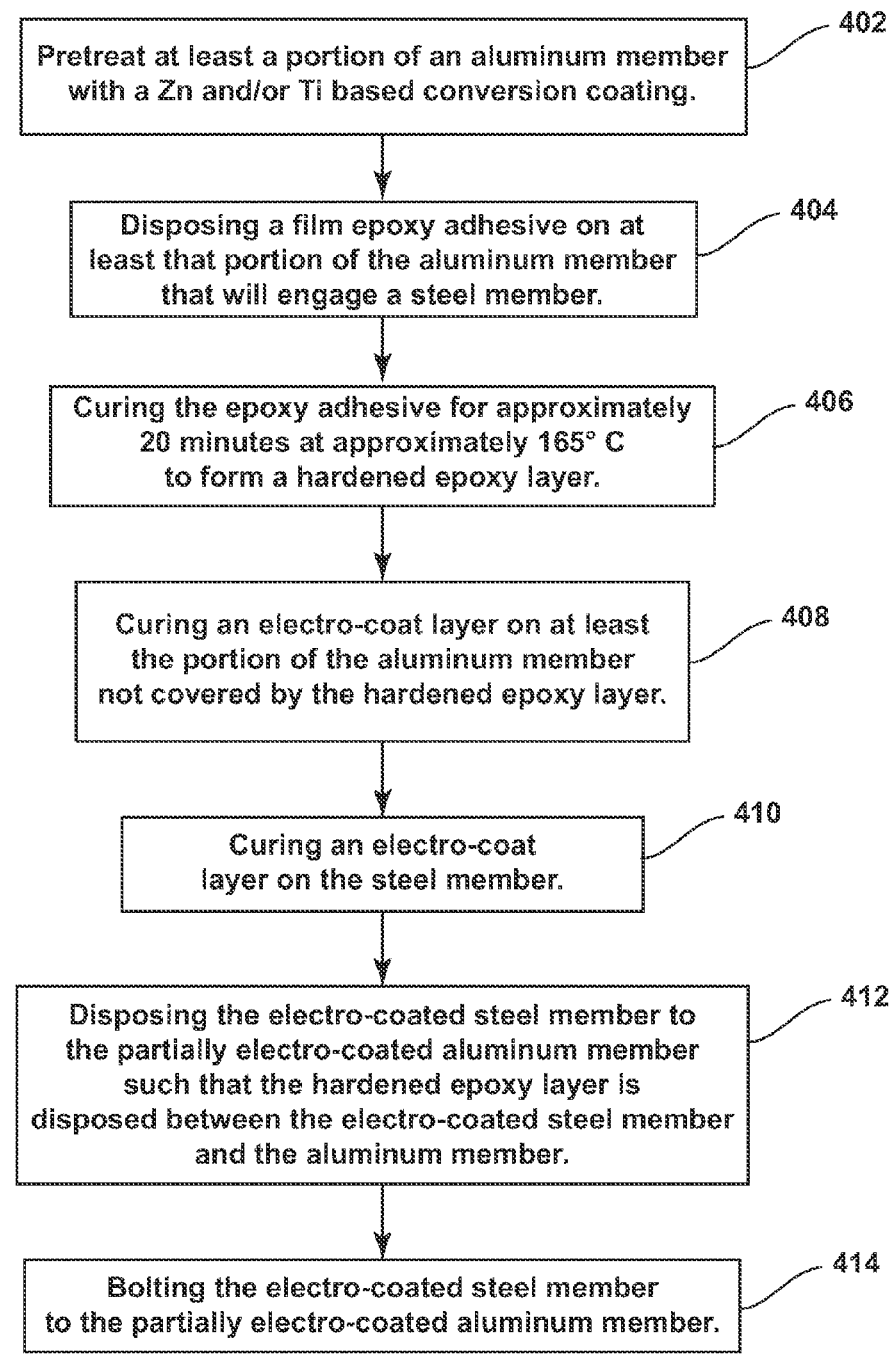
FIG. 4 is a flow chart describing the steps illustrated by the embodiment of FIGS. 1A-3.
Figure 5A:
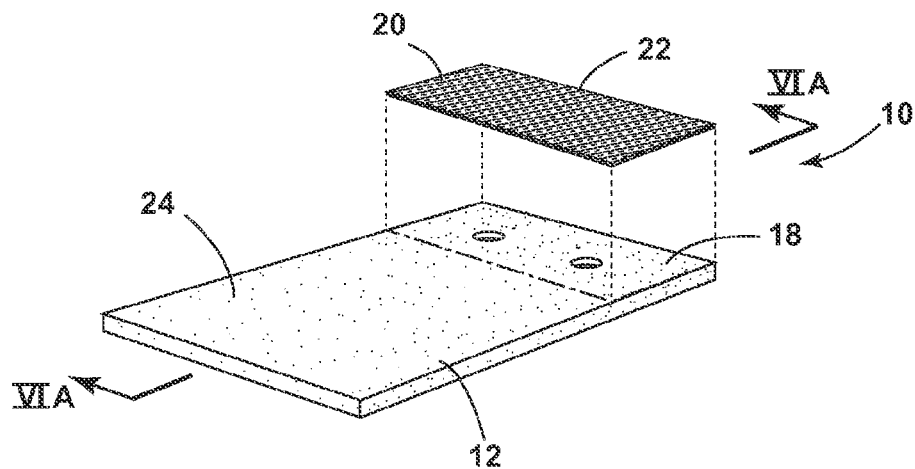
FIG. 5A is a partially exploded perspective view of the film epoxy adhesive applied to the first metal member having a corrosion-resistant layer applied thereto, according to an alternate embodiment of the method.
Figure 5B:
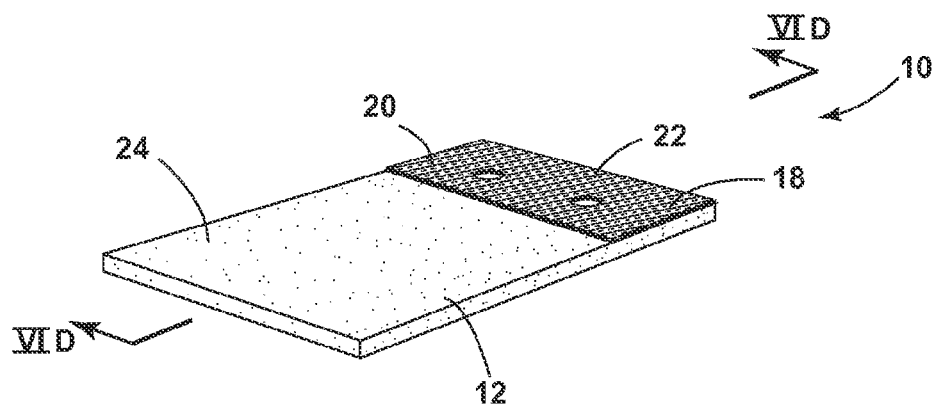
FIG. 5B is a perspective view of the film epoxy adhesive applied to the first metal member coated with the corrosion-resistant layer, according to the alternate method.
Figure 5C:
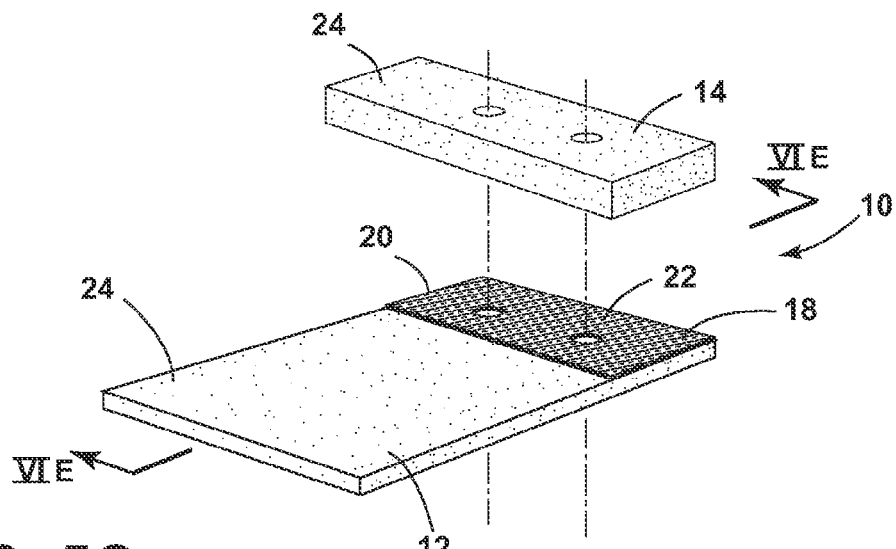
FIG. 5C is a partially exploded perspective view of the embodiment of FIG. 5B with the second metal member coated with a corrosion-resistant layer, being applied to the film epoxy adhesive of the first metal member.
Figure 6A:
FIG. 6A is a cross-sectional section view taken through line VIA-VIA of FIG. 5A before the corrosion-resistant layer is applied to the first metal member.
Figure 6B:
FIG. 6B is a cross-sectional view of FIG. 6A with the corrosion-resistant layer applied thereto.
Figure 6C:
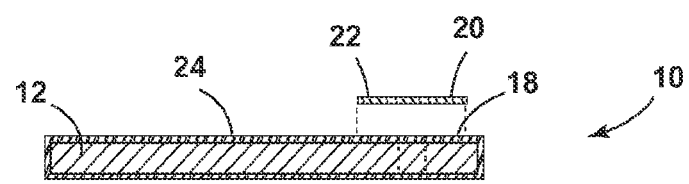
FIG. 6C is a partially exploded cross-sectional view of FIG. 6B with the film epoxy adhesive applied to the coated first metal member.
Figure 6D:
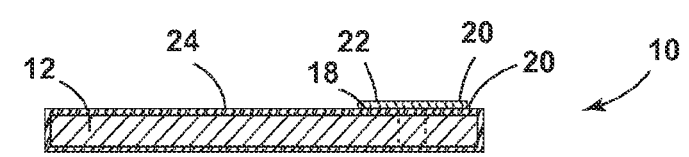
FIG. 6D is a cross-sectional view taken through line VID-VID of FIG. 5B.
Figure 6E:
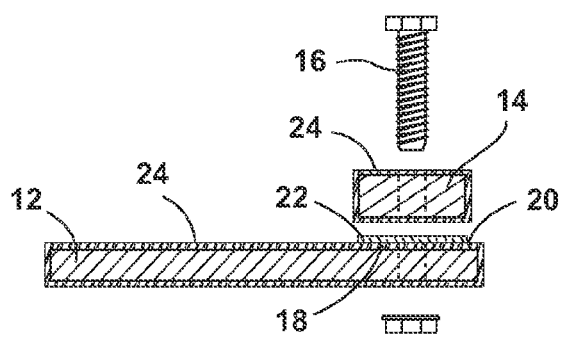
FIG. 6E is a partially exploded cross-sectional view taken through line VIE-VIE of FIG. 5C with a bolt and nut connector included.
Figure 7:
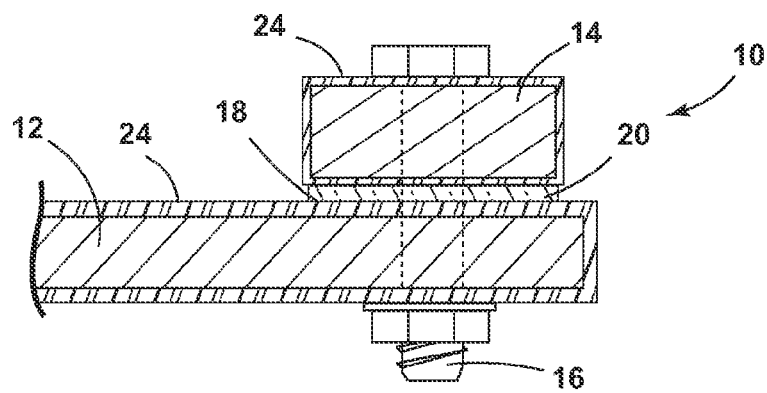
FIG. 7 is a detail cross-sectional view of FIG. 6E with the nut and bolt connector engaged.

Referring now to FIG. 4, the flow chart describes the steps included in the one embodiment of the method 400 described above. Step 402 includes pretreating the connecting region 18 with a Zn and/or Ti based conversion coating. Step 404 includes disposing the film epoxy adhesive 20 on at least a portion of an aluminum member that will engage a steel member. As discussed above, the location of the film epoxy adhesive 20 coincides with the position of the steel member when attached to the aluminum member. Step 406 includes curing the film epoxy adhesive 20 for approximately 20 minutes at approximately 165° C. to form a hardened epoxy layer. Step 408 includes curing an electro-coat layer, or other corrosion-resistant layer 24, on at least the portion of the aluminum member not covered by the hardened epoxy layer. As discussed above, due to the insulative properties of the hardened epoxy layer, the electro-coat layer will not properly deposit on the hardened epoxy layer. Step 410 includes disposing an electro-coat layer, or other corrosion resistant material 24, onto the steel member. The corrosion-resistant material 24 disposed on the first and second metal members 12, 14 can be the same, or can be different corrosion-resistant layers. Step 412 includes disposing the electro-coated steel member to the partially electro-coated aluminum member such that the hardened epoxy layer is disposed between the electro-coated steel member and the aluminum member. Step 414 includes bolting the electro-coated steel member to the partially electro-coated aluminum member. As discussed above, the connection mechanism 16 includes the use of a bolt and nut connector, or similar bolt-type connector.

Referring now to FIGS. 5A-8, an alternate embodiment of the method includes applying the corrosion-resistant layer 24 to the first metal member 12 and the second metal member 14. Once the corrosion-resistant layer 24 is cured, the film epoxy adhesive 20 is disposed on first metal member 12 and positioned on the connection region 18. In this manner, the film epoxy adhesive 20 is placed over the cured corrosion-resistant layer 24. The pretreatment step of disposing a conversion coating upon the connection region 18, as discussed above, is not necessary in this alternative embodiment as the corrosion-resistant layer 24 serves this function in lieu of pretreatment. The film epoxy adhesive 20 is then cured and hardened over the corrosion-resistant layer 24. Once cured, the first metal and second metal members 12, 14 are bolted together at the connection region 18 such that the cured epoxy adhesive 20 is positioned between the first metal and second metal members 12, 14. As with the previously described embodiment, the film epoxy adhesive is cured for 20 minutes at 165° C. As discussed above, the exact length of time and temperature of the curing periods may change depending upon the exact make-up of the film epoxy adhesive 20 used and whether additional materials are cured during the first or second curing process, as described above. Also, the curing process for the various embodiments can occur with or during other curing processes for other materials, which can include, but are not limited to, a paint oven cure process, an adhesive curing process or other material curing process.

Figure 8:
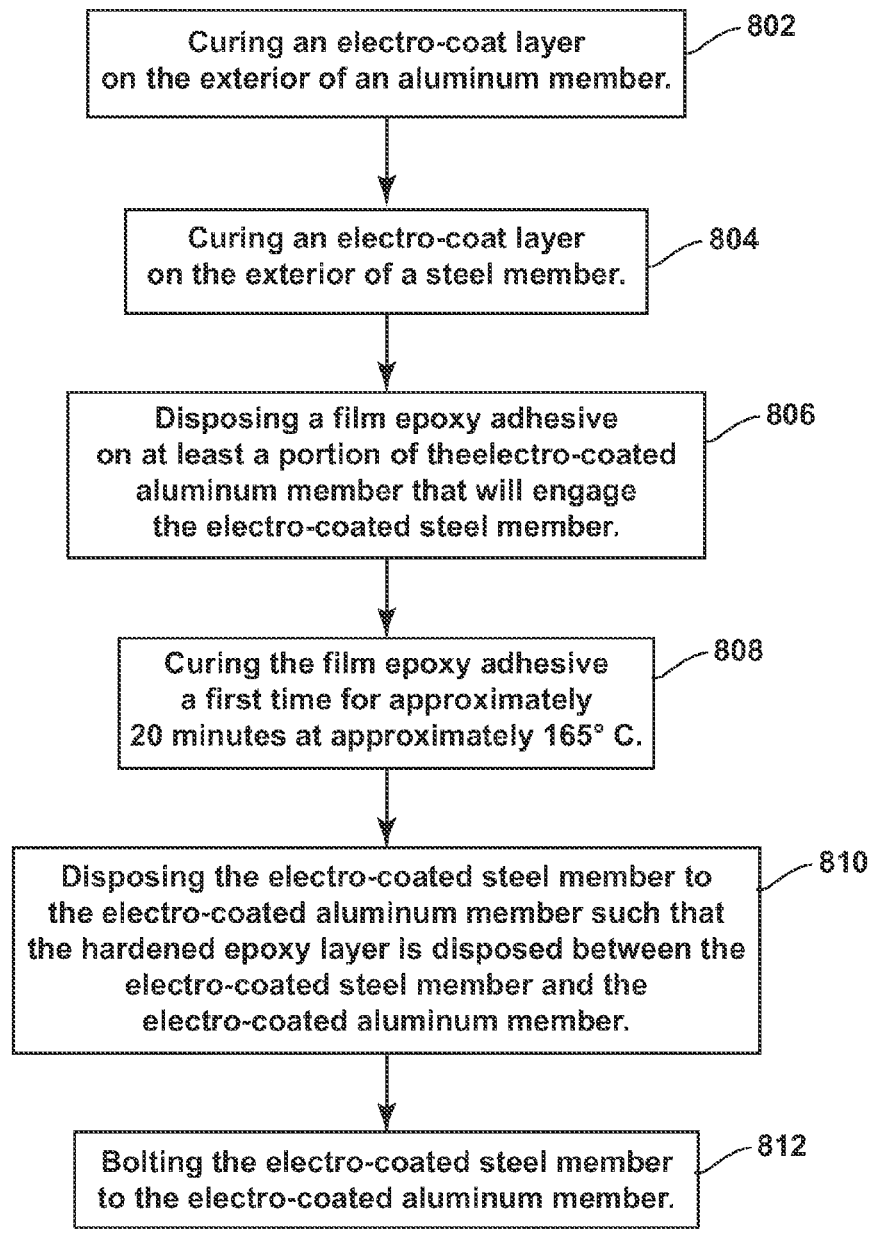
FIG. 8 is a flow chart showing the steps of the method illustrated in FIGS. 5A-7.

Referring now to FIG. 8, the flow chart describes the steps included in an alternate embodiment of the method 800 described above. Step 802 includes disposing a corrosion-resistant layer 24 on the first metal and second metal members 12, 14, and curing each of these layers. Step 804 includes disposing a film epoxy adhesive 20 on at least a portion of the first metal member 12 at the connection region 18 that will engage the second metal member 14. Step 806 includes first curing the film epoxy adhesive 20 for approximately 20 minutes at a temperature of approximately 165° C. to form a hardened epoxy layer. Step 808 includes disposing the electro-coated second metal member 14 to the electro-coated first metal member such that the cured and hardened epoxy layer is disposed between the electro-coated second metal member 14 and the electro-coated first metal member 12. Step 810 includes bolting the electro-coated second metal member 14 to the electro-coated first metal member 12. As discussed above, the connection mechanism 16 includes the use of a connector wherein the connector includes, but is not limited to, a bolt and nut connector, a screw-type connector, or other similar mechanical connector. In various alternate embodiments, other types of connectors can be used.

Similar to the embodiment discussed above, the first metal member 12 is an aluminum member, and the second metal member 14 is a steel member. Although, the first metal member 12 and the second metal member 14 can be made of similar materials or of other differing material types as discussed above. Additionally, the corrosion-resistant layer 24 according to the alternate embodiment can be an electro-coat layer or similar corrosion-resistant layer 24 that is known in the art. However, according to this alternate embodiment, because the film epoxy adhesive 20 is being applied over the corrosion-resistant layer 24, the corrosion-resistant layer 24 need not be applied through an electro-coat process, as in the first embodiment. In the alternate embodiment, the corrosion-resistant layer 24 is applied over the entire outer surface 26 of the first metal and second metal members 12, 14. Also, as in the first embodiment, the film epoxy adhesive 20 of the alternate embodiment is a film-type layer applied to the first metal member 12 wherein the film epoxy adhesive 20 has a substantially consistent thickness being within the range of approximately 0.15 mm to 0.4 mm.

In various embodiments, the film epoxy adhesive 20 can be applied to the first or second metal member 14 or to both the first metal member 12 and the second metal member 14, such that two cured film epoxy adhesive 20 layers are disposed between the first metal and second metal members 12, 14 when connected together. Also, in various embodiments, the film epoxy adhesive 20 can be in the form of a tape-type application.

Also, in various embodiments, it is desirable that the cured film epoxy adhesive 20 occupies substantially the entire connecting region 18 between the first metal member 12 and the second metal member 14, such that the cured film epoxy adhesive 20 is not positioned substantially outside of this region 18. However, in alternate embodiments, the cured film epoxy adhesive 20 can extend outside the boundaries defined by the connection region 18 between the first metal member 12 and second metal member 14.

In the above-described embodiments, as well as alternate embodiments, the cured film epoxy adhesive 20 in the first metal member 12, being disposed against the cured electro-coat layer, creates a cross-linking property between the film epoxy adhesive 20 and the electro-coat layer. In such embodiments, the cross-linking property of the epoxy systems does not result in torque loss of the bolt at elevated temperatures due to creep.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for providing a corrosion-resistant barrier between bolted dissimilar metals comprising the steps of:
   disposing film epoxy adhesive directly on a first metal member, wherein the film epoxy adhesive is an insulator;
   curing the film epoxy adhesive to define a cured film epoxy;
   applying a corrosion-resistant layer directly to the first metal member and a second metal member, wherein the corrosion-resistant layer is free of deposition over the cured film epoxy, wherein the corrosion-resistant layer applied to the first metal member does not adhere to the cured film epoxy;
   exposing the cured film epoxy through portions of the corrosion-resistant layer that are deposited onto the first metal member; and
   bolting the first metal and second metal members together such that the cured film epoxy is positioned directly between and separates the first metal and second metal members.

2. The method of claim 1, wherein the first metal member is aluminum.

3. The method of claim 2, wherein the second metal member is steel.

4. The method of claim 1, wherein the corrosion-resistant layer is a cured electro-coat layer.

5. The method of claim 1, wherein the film epoxy adhesive is cured for approximately 20 minutes at approximately 165° C.

6. The method of claim 1, wherein the cured film epoxy is an electrical insulation, and wherein the corrosion-resistant layer applied to the first metal member is free of adhesion to the cured film epoxy.

7. The method of claim 1, wherein the cured film epoxy has a thickness of approximately 0.15 mm-0.4 mm.

\* \* \* \* \*